(No Model.)

R. V. JONES.
MEAT CUTTER.

No. 391,322. Patented Oct. 16, 1888.

Witnesses.
Wm. M. Monroe,
Irene C. Corey.

Inventor.
Robert V. Jones,
H. T. Fisher
Attorney.

UNITED STATES PATENT OFFICE.

ROBERT V. JONES, OF MOUNT UNION, OHIO.

MEAT-CUTTER.

SPECIFICATION forming part of Letters Patent No. 391,322, dated October 16, 1888.

Application filed May 14, 1888. Serial No. 273,777. (No model.)

*To all whom it may concern:*

Be it known that I, ROBERT V. JONES, a citizen of the United States, residing at Mount Union, in the county of Stark and State of Ohio, have invented certain new and useful Improvements in Meat-Cutters; and I do hereby declare that the following is a full, clear, and exact description of the invention, which will enable others skilled in the art to which it appertains to make and use the same.

My invention relates to meat-choppers, and is an improvement on a chopper patented to me September 5, 1865, No. 49,762. In said patent I employed two cylinders, both of which were provided with spiral flanges or blades part of their length, arranged right and left, respectively, and oppositely-arranged screw-threads the remainder of the length of the cylinders, with a ribbed case and a cutter-blade beneath and between the said cylinders.

In the present invention the spiral blades for forcing the feed run the entire length of the cylinders. The screw-threads, the cutter-blade below, and the ribs on the case are omitted, and rotary and stationary cutters are arranged on the respective axles of the cylinders, substantially as shown and hereinafter described.

Figure 1:
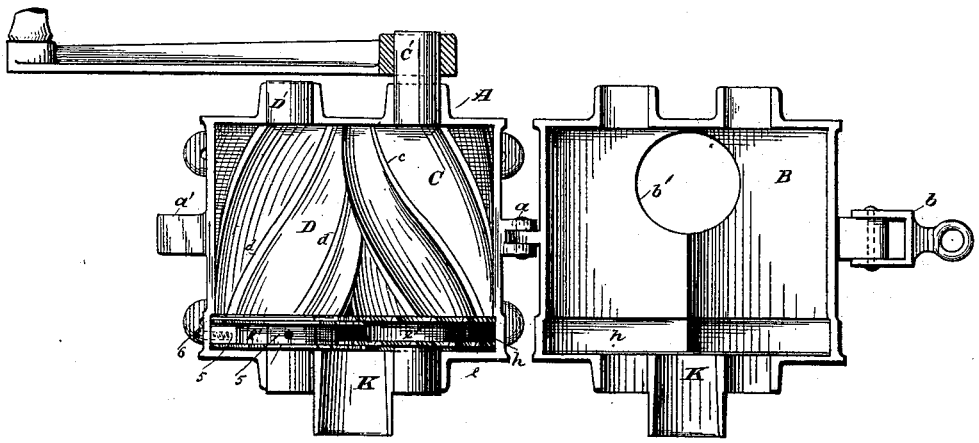
Figure 2:
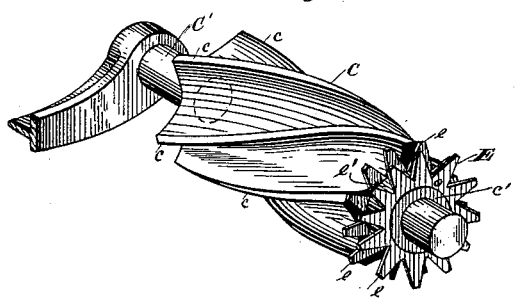
Figure 3:
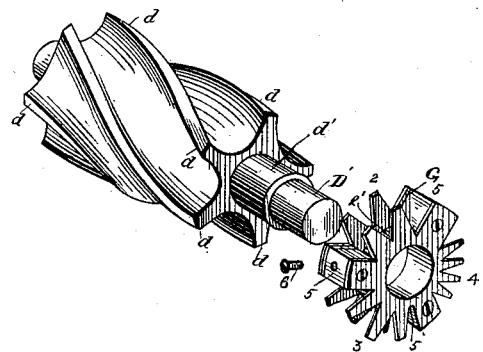

Referring to the drawings, Figure 1 shows the cutting-machine with the upper half of the casing, constituting the cover, thrown open and the inside exposed to view. Fig. 2 is a perspective view of the actuating-cylinder with its cutter at the end fixed upon the shaft, and Fig. 3 a similar view of the other cylinder with the cutter detached.

A represents the section or half of the casing supporting the cylinders and cutters, and B the cover or other half of the casing, the two secured together by one or more hinges, $a$, and pivoted catch $b$, for engaging a lug, $a'$, on the lower section. These features are not new.

C represents the actuating or drive cylinder on shaft $C'$, and D the driven cylinder on shaft $D'$. These cylinders are made with meshing blades $c\ d$, running spirally in opposite directions and away from each other, starting with the initial end, where the meat is fed into the machine through opening $b'$ in the cover B— that is to say, when the spiral blades first cross each other it is at this initial end, and the feed action of the blades proceeds from this point to the opposite ends of the cylinders, so that the meat is forced forward by the joint action of the spirals to and into the cutters, where the effective work of mincing the meat to any desired degree of fineness occurs.

Two of the cutters are employed with the feed-cylinders. Each cutter has a double set of blades, $e$, shaped somewhat like saw-teeth, preferably blunt at their ends and sharp along their respective sides. The sets of blades in each cutter are spaced equal distances apart by interposed sleeves $e'$ or blocks of any suitable form, to which they are secured, so that each cutter as an article has the two sets of blades firmly united as here shown, but separable when it is desired to sharpen the teeth. The cutter E is removably fixed on a sleeve projection, $c'$, on the end of cylinder C, by set-screw or other means that will permit easy removal, and preferably has teeth $e$ in the two series so arranged that the teeth in one series are opposite the spaces between those in the opposite series; but they may be arranged directly opposite each other.

The cutter G is loosely sleeved on a sleeve projection, $d'$, on cylinder D, and, as here shown, has teeth of three different sizes, represented in their order, according to size, by 2 3 4. Blocks or arms 5, extending out flush with the ends of the teeth, divide this cutter between the sets of teeth 2 3 4, and screw-holes are formed in the blocks and a set-screw, 6, passing through the casing into said screw-hole, serves to fasten the said cutter after each adjustment thereof on the shaft D.

If it is desired to cut the meat coarse, the teeth 2 are set to work with the teeth of the rotary cutter E, and for finer cutting the other teeth, 3 4, may be brought into use. This stationary cutter may be provided with even a greater variety of teeth, especially in larger machines, if desired. A very slight annular depression, $h$, is shown in the end of the casing within which the cutters work.

The discharge-opening K is central in the end of the casing, a portion being formed in each of the upper and lower parts thereof, and the action of the two sets of blades is directly opposite this opening. This also is the point or center to which the meat is carried by the cylinders, and when the pressure and force of the blades is exerted to drive the meat through the machine.

The operation of the machine will be understood from the foregoing description and need not be more specifically set forth.

It will be seen that in this machine the inside of the casing is perfectly smooth, so that it is easily cleaned. It is obvious that with my arrangement of double overlapping cutters, through which the meat is driven by gradual pressure, every part must be absolutely cut short and that no strings or stringy meat can get through. The fact that there is no stationary part through which the meat must be forced before it comes in contact with the cutter contributes greatly to the easy operation of the machine, which is an object when hand-power is employed.

It will be obvious that the stationary cutter could be formed with teeth of a single size, and that other cutters with differently-sized teeth could be kept to interchange, according to the fineness of the meat wanted. Both cutters are fixed directly at the ends of the spiral blades, and there is no intervening part. The blades of one series work closely by the corresponding series in the opposite cutter and a shearing-cut is obtained which is very effectual.

The invention is not limited to two cutter-blades with each cylinder, as two or more could be used.

Having thus described my invention, what I claim as new, and desire to secure by Letters Patent, is—

1. In a meat-cutter, two cylinders with spiral force-feed blades meshing with each other, in combination with two sets of sharp-edged cutters at the ends of the cylinders, one set to revolve with the driven cylinder and the other set of cutters stationary at the end of the driven cylinder, substantially as set forth.

2. In a meat-cutter, a driving-cylinder having a cutter at its end provided with rows of cutting-teeth, in combination with a driven cylinder and a rotary adjustable cutter attached to the cutter-frame at the end of said cylinder, substantially as set forth.

3. In a meat-cutter, a stationary cutter having teeth of different sizes on its periphery and adjustable to bring any given size of teeth into cutting position, in combination with revolving cutters and force-feed cylinders, substantially as set forth.

4. In a meat-cutter, stationary cutter-blades consisting of two disks having teeth on their periphery, said disks being separated by spacing-blocks and open centrally for the passage of the spindle of one of the force-feed cylinders, in combination with a set of revolving cutters and the force-feed cylinders, substantially as set forth.

ROBERT V. JONES.

Witnesses:
W. P. RICE,
CHARLES E. RICE.